Patented Apr. 17, 1951

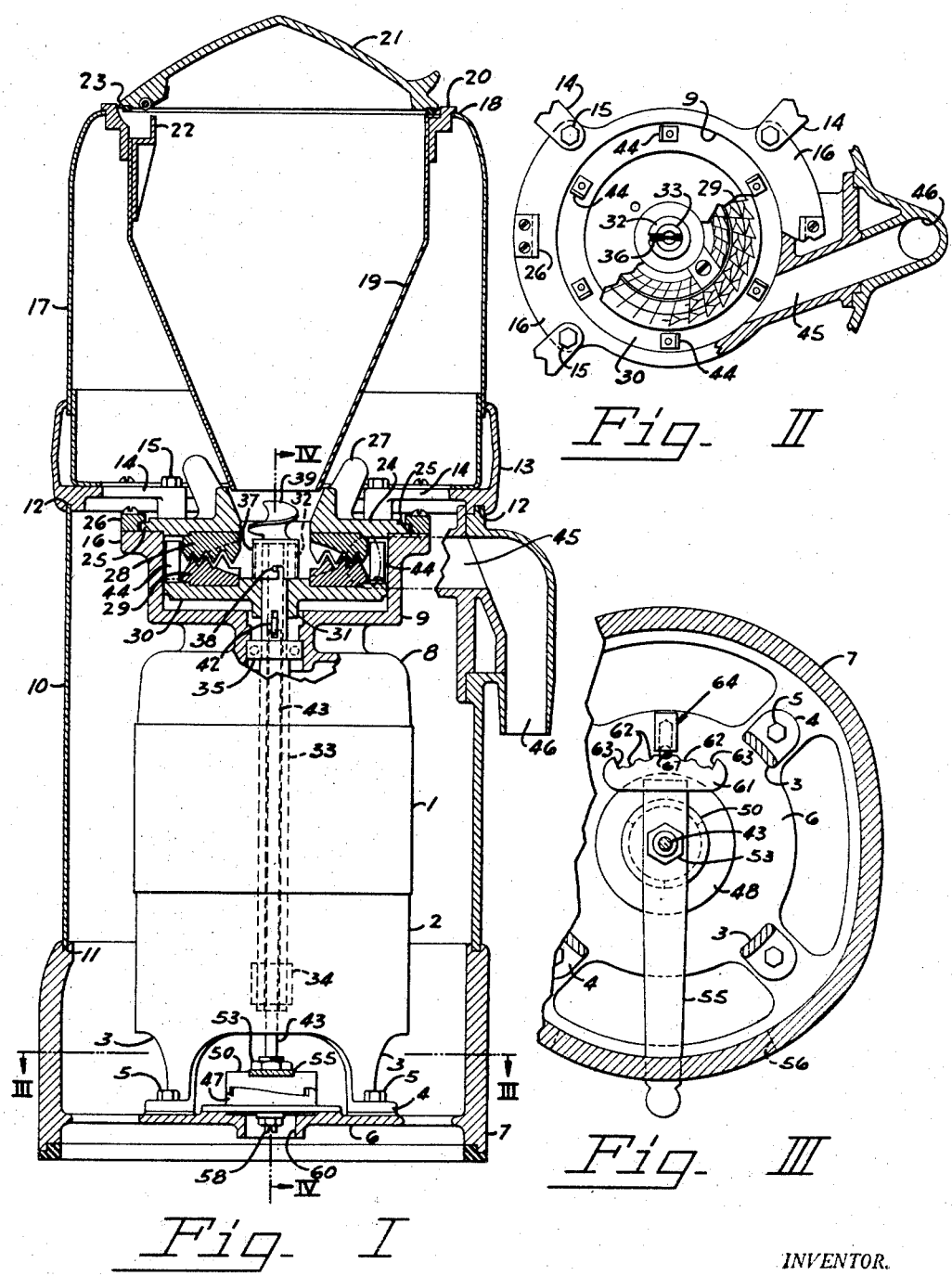
April 17, 1951  G. R. WOOD  2,549,275
COFFEE MILL
Filed April 11, 1946  2 Sheets-Sheet 1
Fig. I
Fig. II
Fig. III
INVENTOR.
George R. Wood
BY
Marshall & Marshall
ATTORNEYS

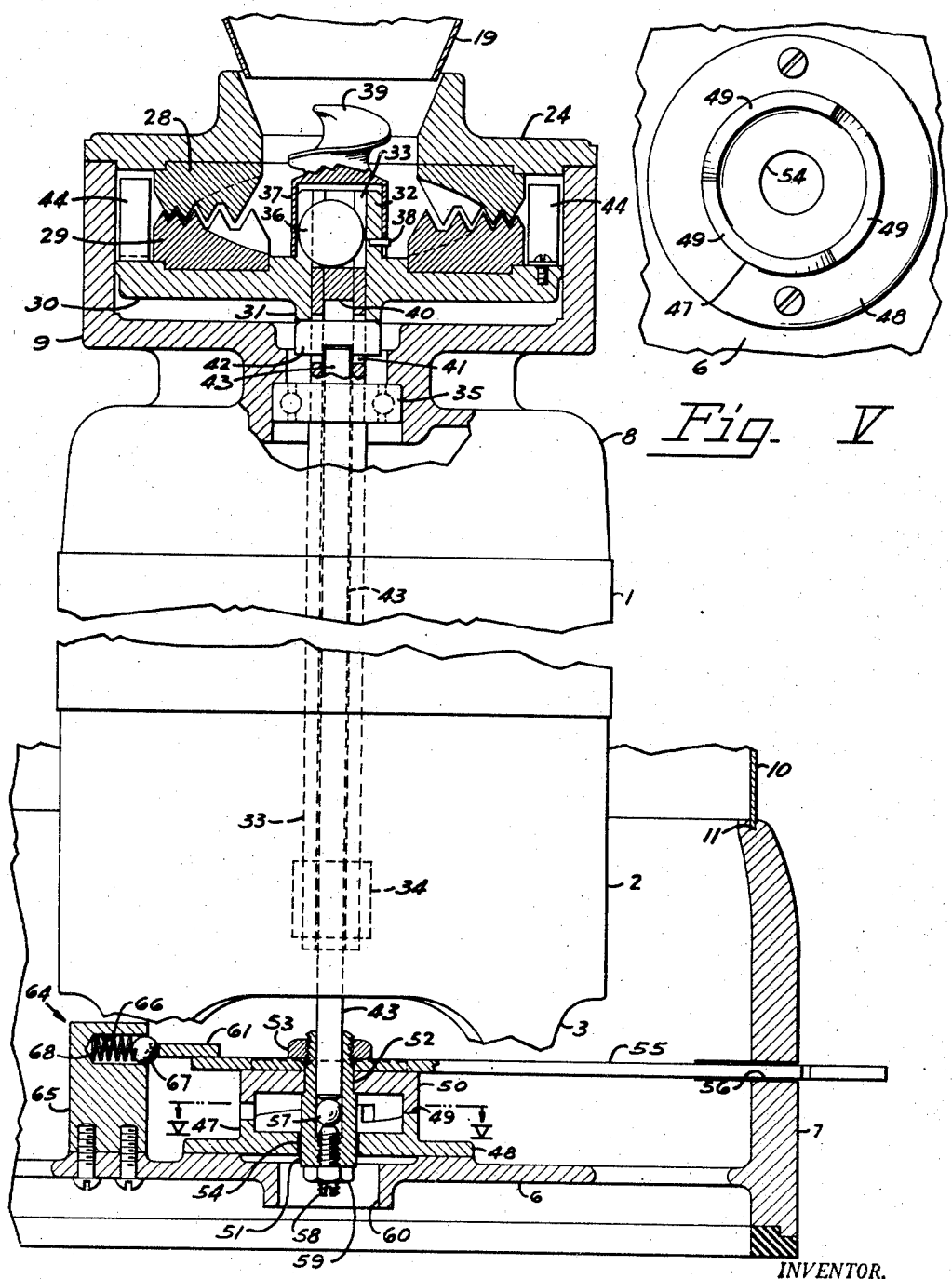

2,549,275

UNITED STATES PATENT OFFICE 2,549,275

COFFEE MILL

George Rue Wood, Toledo, Ohio, assignor to Toledo Scale Company, Toledo, Ohio, a corporation of New Jersey Application April 11, 1946, Serial No. 661,441

5 Claims. (Cl. 241—246)

This invention relates to coffee mills and in particular to improvements in the burr adjusting mechanism which regulates the fineness of the grinding.

To secure satisfactory operation in a grinding device such as a coffee mill it is imperative that the burrs be accurately positioned with respect to each other and the clearance between them be accurately regulated. In many coffee grinding machines the rotating burr is carried directly on the motor shaft and means are provided for moving the stationary burr toward or away from the rotating burr for adjusting the clearance between them. This arrangement suffers from the disadvantage that the axial thrust of the burrs must be carried by the motor shaft bearings and that the motor bearings are subject to very high axial loads in case hard foreign material gets between the burrs. Besides these operating difficulties the conventional mechanisms for adjusting the clearance between the burrs by moving the stationary burr are usually complicated and expensive.

The principal object of this invention is to provide a coffee mill in which none of the axial thrust produced by the grinding burrs is carried by the motor shaft.

Another object is to provide a coffee grinder in which the stationary burr is rigidly mounted from the cover of the burr chamber and the rotating burr is axially adjusted by a burr supporting and adjusting means extending through a tubular motor shaft.

Another object is to provide a vertically disposed coffee mill with grind selecting mechanism located in the base of the mill.

A still further object is to provide a coffee mill constructed so that the mill may be disassembled for cleaning and reassembly with complete assurance that the adjustment of the clearance between the burrs will not be detrimentally affected.

These and other objects and advantages are apparent from the following detailed description of a specific embodiment of the invention.

According to the invention the motor shaft is relieved of axial thrust and the clearance between the burrs is regulated by slidably keying the rotating grinding burr to a tubular motor shaft, supporting the rotating burr on the end of an adjusting rod passed axially through the tubular motor shaft and positioning the rod axially with respect to the motor shaft by a cam-supported thrust bearing located between the rod and the base on which the motor is mounted. This arrangement separates the adjusting means from the burr chamber so that the adjusting means is not exposed to the dust and chaff which is inevitably present when coffee is being ground. Furthermore, it permits the burrs to be positively and rigidly held with proper clearance maintained between them.

A specific embodiment of the invention is illustrated in the accompanying drawings, in which:

Figure I is a vertical section of a coffee mill embodying the invention.

Figure II is a fragmentary plan view looking down into the grinding chamber, parts being shown in section and parts broken away to reveal the details of construction.

Figure III is a fragmentary plan view, partly in section, taken substantially along the line III—III of Figure I.

Figure IV is a fragmentary vertical section at an enlarged scale, the section being taken substantially along the line IV—IV of Figure I.

Figure V is a plan view taken substantially along the line V—V of Figure IV, the removable part of the cam having been removed to show the camming surfaces of the stationary cam.

These specific figures and the accompanying description are intended merely to illustrate the invention but not to impose limitations on the claims.

The coffee mill selected to illustrate the invention has a driving motor 1 whose lower end frame 2 is provided with legs 3 terminating in feet 4 which by means of bolts 5 are secured to a shelf 6 of a generally cylindrical base 7. If desired, a ring of resilient material may be installed beneath the side wall of the base 7 to prevent it from marring a counter top or other surface on which the coffee mill is placed.

An upper end bell or frame 8 of the motor 1 is extended upwardly to form a cup-shaped grinding chamber 9. The motor 1 and the grinding chamber 9 are surrounded by a generally cylindrical housing 10. The housing 10, made of thin sheet metal or similar material, rests in a groove 11 cut in the top of the side walls of the base 7 and fits into a groove 12 in the under surface of a housing ring 13. The housing ring 13 has several inwardly directed arms 14 which by means of bolts 15 are secured to a flange 16 extending laterally from the grinding chamber 9. A cylindrical hopper support 17 which is set into the housing ring 13 extends upwardly and is terminated in an inwardly directed ledge 18 defining a large circular hole in the top of the housing. A hopper 19 having a shouldered supporting ring 20 secured at its upper edge fits into the hopper support 17 with one of the shoulders of the supporting ring 20 resting on the ledge 18. The hopper is provided with a domed cover 21 hinged along one side of the hopper. Immediately below the hinge a baffle plate 22 is fitted within the hopper 19 so that an edge 23 of the cover 21 behind the hinge may swing down and by contacting the baffle plate 22 limit the travel of the cover 21. The baffle plate 22 also prevents any coffee beans from lodging beneath the hinge where they would interfere with the opening or closing of the cover 21.

A grinding chamber cover 24 whose lower surface is shouldered to pilot it on the grinding chamber 9 has radially extending ears 25 adapted to lock beneath catches 26 screwed to the upper surface of the flanges 16. A pair of wings 27, similar to the wings of a wing nut, extend upwardly from the cover 24 so that it may be rotated by hand when it is necessary to remove it to clean or inspect the machine.

The cover 24 has an axial opening through it which registers with the bottom end of the hopper 19 so that material placed in the hopper may be fed into the grinding chamber 9. A stationary annular grinding burr 28 is secured to the lower surface of the cover 24 and is thus rigidly positioned with respect to the grinding chamber 9.

A rotating burr 29 adapted to cooperate with the stationary burr 28 is mounted on a rotating table 30 which is a close fit within the chamber 9. The rotating table 30 has a hub portion 31 extending downward and another hub portion 32 extending upwardly to hold it on a tubular motor shaft 33 extending upwardly into the grinding chamber 9. The tubular motor shaft 33 is carried in a sleeve bearing 34 at its lower end and in a ball bearing 35 located in the end frame 8. The upper end of the armature shaft 33 is slotted and one side of the upwardly extending hub 32 of the rotating table 30 is similarly slotted so that a disk 36 similar in size and shape to a copper cent may be employed as a shearable key to transmit torque from the motor shaft 33 to the rotating table 30. The disk 36 is held in position in the slots by a cap 37 fitted down over the hub 32 and held in place by a pin 38 engaged in a slot in the side of the cap 37. If desired the cap 37 may be provided with a feed screw 39 to assist in feeding material from the hopper 19 into the space between the burrs 28 and 29.

If for any reason the rotating burr 29 should catch, as happens when a piece of foreign material gets between the burrs, the disk 36 is sheared and the motor can continue to rotate. When this occurs the machine may be easily disassembled by removing the hopper and the grinding chamber cover 24 which exposes the lower burr so that the foreign material may be removed. The cap 37 may then be removed to expose the disk 36 so that it may be pushed out of the slots in the end of the motor shaft and the hub 32 and either replaced by a new disk or turned part way around so that a new portion is engaged between the shaft and the hub. The cap 37, the cover 24 and the hopper 19 may then be replaced. A plug 40 driven into the tubular motor shaft 33 until its top is immediately below the bottom of the slots in the end of the shaft prevents any sheared pieces of the disk 36 from dropping down the motor shaft. Immediately below the level of the rotating table 30 the motor shaft 33 is provided with a broached hole 41 through which a flat key 42 is fitted. The hub 31 of the rotating table 30 rests on the ends of the key 42 which in turn is supported on an adjusting rod 43 extending axially through the tubular motor shaft 33. Axial adjustment of the adjusting rod 43 regulates the clearance between the burrs 28 and 29 and thus controls the fineness of the grind.

The rotating table 30 carrying the lower burr 29 has a number of vanes 44 erected in the space radially outside of the burr 29. The vanes 44 serve to sweep the ground coffee around the periphery of the grinding chamber 9 and to force it out through a generally tangential discharge passage 45 which terminates in a downwardly directed spout 46. The passage 45 opens into the grinding chamber 9 at such an elevation that its lower surface is slightly below the top of the rotating table 30. This arrangement of parts combined with the close fit between the periphery of the rotating table 30 and the interior of the grinding chamber 9 effectively prevents leakage of ground coffee into the space beneath the table 30.

The lower end of the adjusting rod 43 is carried in a special thrust bearing which permits its axial position with respect to the grinding chamber 9 to be accurately regulated. This thrust bearing comprises a stationary cam 47 whose flanged base 48 is screwed to the shelf 6 of the base 7. The active surface of the cam 47 consists of three 120° helical sections 49. A cup-shaped cam follower 50 having helical surfaces about its rim to match the cam surfaces 49 is supported rim down on the stationary cam 47 with the two sets of helical surfaces in contact with each other. A shouldered stud 51 is passed upwardly through a hole 52 in the bottom of the cup-shaped cam follower 50 and is secured in place by a nut 53 screwed onto the stud 52 above the cam follower 50. The stud 52 extends down through a hole 54 drilled through the center of the stationary cam 47 so that the stud 52 may serve as a pilot to maintain the cam follower 50 in axial alignment with the cam 47 as it is rotated thereon. A shallow slot is milled across the top surface of the cam follower 50 to receive a handle 55 formed of a strip of heavy sheet metal. The handle is clamped against the cam follower 50 by the nut 53. Its free end protrudes through a slot 56 in the side wall of the base 7 so that it may be easily moved sideways to rotate the cam follower 50 with respect to the stationary cam 47.

The stud 52 set in the cam follower 50 is bored out to journal the lower end of the adjusting rod 43. Friction between the end of the rod 43 and the stationary parts of the bearing is minimized by a hardened steel bearing ball 57 dropped into the hollowed-out stud 52 before the rod 43 is put in place. The lower end of the rod 43 also may be hardened to reduce wear. The bearing ball 57 rests on the upper end of an adjusting screw 58 threaded axially upwardly through the bottom end of the stud 52. It is locked in its adjusted position by a lock nut 59.

The shelf 6 has an opening 60 immediately beneath the stationary cam 47 making it unnecessary to disassemble any of the mechanism of the coffee mill to adjust the screw 58 of the thrust bearing to compensate for wear of the grinding burrs.

In this arrangement the burrs are adjusted for fine, medium or coarse grind by manipulation of the handle 55 which rotates the cam follower with respect to the cam and thus raises or lowers the adjusting rod 43 with respect to the grinding chamber 9. The adjustment provided by the screw 58 is used only to compensate for wear and to secure the correct grind for the various settings of the handle 55. To hold the handle 55 in its selected position a detent plate 61 is welded or otherwise secured to the handle 55 adjacent the cam follower 50. The detent plate 61 is provided with a plurality of notches 62 and stops 63 which cooperate with a detent assembly 64 consisting of a block 65 screwed to the shelf 6 and having a drilled hole 66 to accommodate a ball 67 and a spring 68. The hole 66 is in horizontal alignment with the detent plate 61 and is placed so that the spring pressed ball 68 may engage the notches 62 and thus establish definite positions for the handle 55 and cam follower 50.

If desired, suitable indicia may be inscribed on the wall of the base 7 adjacent the path of the handle 55. These indicia serve to mark the positions of the handle 55 required to secure various grinds of coffee, such as "coarse," "medium," "fine," etc. The number of degrees of fineness for which the coffee mill may be positively adjusted is determined by the number of notches 62 provided in the detent plate 61.

While the handle 55 has been shown extending from a side of the housing its location may easily be changed so as to bring it out at the front or some other convenient position.

In the improved coffee mill design as shown in the example the thrust of the grinding burrs in the burr chamber 9 is carried by the adjusting rod 43 and the thrust bearing mounted on the shelf 6 so that no axial thrust is transmitted to the motor bearings. The spacing between the burrs is very easily adjusted by a conveniently located handle and the adjustment is not altered in any way when the burrs are disassembled for cleaning or to remove foreign material. The only place in which dust or coffee chaff could possibly affect the burr clearance is between the rim of the burr chamber and the cover. But in that event it would be found exceedingly difficult or impossible to engage the ears 25 beneath the locking lugs 26 secured to the flange of the burr chamber. All the adjustments for the grinder may be easily made from the exterior of the machine and are not disturbed during normal cleaning operations.

Various modifications or substitutions can be made without losing the advantages afforded by the improved design. Therefore the specific example described should be considered as illustrative only and not as defining the scope of the invention.

Having described my invention, I claim:

1. In a device of the class described, in combination, a base, a motor mounted on end on the base, end frames for the motor the lower one of which serves to support the motor from the base, a burr chamber formed integrally with the upper end frame of the motor, an apertured cover for the chamber, means for feeding material into and from the chamber, a burr non-adjustably attached to the cover, a tubular shaft for the motor, a rotatable burr driven by and slidable along the tubular shaft, a rod extending axially through the shaft, means for operatively connecting the rod to the rotatable burr, and a manually operable cam mounted on the base beneath the motor and engaging the rod for axially positioning the rod to regulate the clearance between the burrs.

2. In a device of the class described, in combination, a vertically mounted motor, a burr chamber constituting an integral part of the upper end frame of the motor, an apertured removable cover for the chamber adapted to be rigidly locked in closed position, a generally annular burr fixedly supported by the cover, a tubular armature shaft for the motor, a burr cooperating with the fixed annular burr and slidable on and driven by the shaft, a cross member supporting the driven burr, a rod extending axially through the shaft and cooperating with the cross member to position the driven burr axially on the shaft, a cam assembly mounted on a base at the other end of the motor and engaging the rod for shifting the rod axially, and means for adjusting the position of the rod with respect to the cam assembly.

3. In a coffee mill, in combination, a base, a motor mounted on end on the base, an upper end frame for the motor, said end frame including a cup-like portion serving as a grinding chamber, said motor having its armature shaft extended into the grinding chamber, a cover fitting the mouth of the grinding chamber, said cover having a central opening, an annular grinding burr fixed to said cover, a driven burr slidably mounted on the armature shaft, means extending through the armature shaft for axially positioning the driven burr, said driven burr having a hub extending upwardly toward the opening in the annular burr, said hub and said armature shaft having alignable slots, a shear key fitted in the slots, and a feed screw fitted with a socket that fits over the ends of the hub and the armature shaft to retain the shear key in place.

4. In a coffee mill, in combination, a motor that is mounted on end with its armature shaft vertical, an upper end frame for the motor, the end frame including an upwardly opening generally cylindrical cup-like portion serving as a grinding chamber, a cover for the grinding chamber, said cover having an opening for the introduction of material into the grinding chamber, a grinding burr fixed to the cover, a cooperating grinding burr mounted on the armature shaft of the motor, means extending through the armature shaft for adjusting the axial position of the cooperating burr to vary the spacing between the burrs, said cooperating burr having an upwardly directed hub, said hub and said armature shaft having aligned slots, a shear key in the slots, and a cap fitted over the end of the hub, said cap including a feed screw for drawing material into the grinding chamber.

5. In a coffee mill, in combination, a motor that is mounted on end with its armature shaft vertical, an upper end frame for the motor, a generally cylindrical grinding chamber formed in the upper end of said motor end frame, an apertured cover for the grinding chamber, a grinding burr fixed to the cover, a second grinding burr slidably carried on the armature shaft, means for positioning the second burr along the shaft, said second burr having an upwardly extending hub, said hub and the armature shaft having slots, a shearable key in the slots, and a cap fitted over the hub and shaft to retain the shearable key in position in the slots.

GEORGE RUE WOOD.

(References on following page)

REFERENCES CITED

The following references are of record in the file of this patent:

UNITED STATES PATENTS

| Number | Name | Date |
|---|---|---|
| 82,362 | Swesey | Sept. 22, 1862 |
| 253,496 | Ross | Feb. 14, 1882 |
| 359,587 | Wilcox et al. | Mar. 15, 1887 |
| 375,533 | Coles | Dec. 27, 1887 |
| 1,344,453 | Rousseau | June 22, 1920 |
| 1,629,377 | Buckwalter | May 17, 1927 |
| 1,663,607 | Naul | Mar. 27, 1928 |
| 1,762,122 | Marsh | June 3, 1930 |
| 2,019,013 | Kopf et al. | Oct. 29, 1935 |
| 2,094,548 | Meeker | Sept. 28, 1937 |
| 2,138,204 | Nable | Nov. 29, 1938 |
| 2,142,203 | Morgan | Jan. 3, 1939 |
| 2,147,821 | Morehouse | Feb. 21, 1939 |
| 2,171,144 | Frock | Aug. 29, 1939 |
| 2,229,031 | Anderson | Jan. 21, 1941 |